US012693492B2

(12) United States Patent
Sato

(10) Patent No.:    US 12,693,492 B2
(45) Date of Patent:       Jul. 28, 2026

(54) CONTROL SYSTEM OF LINEAR ACTUATOR, LENS APPARATUS, IMAGE CAPTURING APPARATUS, CONTROL METHOD OF LINEAR ACTUATOR, AND STORAGE MEDIUM

(71) Applicant: CANON KABUSHIKI KAISHA, Tokyo (JP)

(72) Inventor: Kyosuke Sato, Kanagawa (JP)

(73) Assignee: CANON KABUSHIKI KAISHA, Tokyo (JP)

( * ) Notice:    Subject to any disclaimer, the term of this patent is extended or adjusted under 35 U.S.C. 154(b) by 273 days.

(21) Appl. No.: 18/676,947

(22) Filed:    May 29, 2024

(65)           Prior Publication Data

US 2024/0418960 A1      Dec. 19, 2024

(30)       Foreign Application Priority Data

Jun. 16, 2023    (JP) ................................. 2023-099259

(51) Int. Cl.
*H04N 5/335*        (2011.01)
*G02B 7/10*         (2021.01)
*G03B 5/02*         (2021.01)

(52) U.S. Cl.
CPC .............. *G02B 7/102* (2013.01); *G03B 5/02* (2013.01); *G03B 2205/0069* (2013.01)

(58) Field of Classification Search
CPC ...................................................... G03B 5/02
See application file for complete search history.

(56)              References Cited

FOREIGN PATENT DOCUMENTS

| JP | H07105641 A |   | 4/1995 |
| JP | 2018091957 A | * | 6/2018 |
| JP | 2021175244 A |   | 11/2021 |

* cited by examiner

*Primary Examiner* — Gary C Vieaux
(74) *Attorney, Agent, or Firm* — Cowan, Liebowitz & Latman, P.C.

(57)            ABSTRACT

A control system of a linear actuator that is provided with a coil and a magnetic field unit, and is configured to drive a drive target object along a main axis, is configured to acquire position information of the drive target object or the linear actuator from an encoder and calculate the position information of the drive target object and the linear actuator, calculate a control amount to control drive of the linear actuator, based on position information of the drive target object and a target position to move the drive target object, determine an output level of the linear actuator based on the control amount, determine an output direction of the linear actuator, based on the control amount and the position information of the linear actuator, calculate a correction gain for correcting the control amount, based on the position information, the output level, and the output direction of the linear actuator, and correct the control amount by using the correction gain.

12 Claims, 9 Drawing Sheets

FIG. 8A

CONTROL SYSTEM OF LINEAR ACTUATOR, LENS APPARATUS, IMAGE CAPTURING APPARATUS, CONTROL METHOD OF LINEAR ACTUATOR, AND STORAGE MEDIUM

BACKGROUND OF THE INVENTION

Field of the Invention

The present invention relates to the control of a linear actuator, particularly a linear direct current motor of a unipolar type, among electromagnetic linear motors.

Description of the Related Art

Because electromagnetic linear motors can perform power transmission without contact, it is easy to obtain excellent performance such as low noise, low vibration, high durability, and the capability for high-precision positioning, and electromagnetic linear motors are utilized in precise drive mechanisms, positioning mechanisms, and the like. Among electromagnetic linear motors, particularly the unipolar type linear direct current motor, which is a linear actuator of a unipolar type, offers high efficiency even in compact sizes despite a limited driving range, and has additional advantages such as easy drive control due to low thrust ripple. Therefore, unipolar type linear actuators are utilized in precision devices such as HDDs (Hard Disk Drives) and cameras. In contrast, unipolar-type linear actuators include a feature whereby efficiency decreases from the central part of the stroke towards an end part as the stroke progresses. This is caused by the magnetization (magnetic flux density relative to the magnetic field) of a yoke, which configures a field magnet unit, not being infinite but instead becoming saturated. Therefore, a unipolar-type linear actuator generates an output characteristic difference depending on the stroke position. In scenarios in which positioning control is performed by driving a load (drive target object) at high speed with a unipolar-type linear actuator, the output characteristic difference due to the stroke position can influence positioning characteristics, such as the time required for positioning and the followability during movement.

In order to reduce the influence of an output characteristic difference of an actuator, Japanese Laid-Open Patent Publication No. H7-105641 discloses a configuration provided with a gain adjustment unit configured to correct the gain of control according to the stroke position of the actuator. In addition, Japanese Laid-Open Patent Publication No. 2021-175244 discloses a configuration in which a portion of the field magnet unit near the middle of the stroke of the actuator is formed as a shape that is smaller than usual, thereby relatively lowering the efficiency near the middle part of the stroke and improving the efficiency near the end parts.

However, the configuration disclosed in Japanese Laid-Open Patent Publication No. H7-105641 alone is insufficient to fully reduce the influence of output characteristic differences during driving on positioning characteristics. In addition, because the configuration disclosed in Japanese Laid-Open Patent Publication No. 2021-175244 intentionally reduces efficiency near the middle part of the stroke, there may be a risk of compromising performance in critical metrics such as rated output and idle power consumption, in addition to positioning time and followability.

SUMMARY OF THE INVENTION

The object of the present invention is to reduce the influence on drivability caused by output characteristic differences of a linear actuator.

A control system for a linear actuator of the present invention is provided with a coil and a magnetic field unit, and is configured to drive a drive target object along a main axis, comprising: at least one processor and/or circuit configured to function as following units: a position calculation unit configured to acquire position information of the drive target object or the linear actuator from an encoder, and to calculate the position information of the drive target object and the linear actuator; a control amount calculation unit configured to calculate a control amount to control the driving of the linear actuator, based on position information of the drive target object and a target position to move the drive target object; a determination unit configured to determine an output level of the linear actuator based on the control amount; a direction determination unit configured to determine an output direction of the linear actuator, based on the control amount and the position information of the linear actuator; a gain calculation unit configured to calculate a correction gain for correcting the control amount, based on the position information of the linear actuator, the output level of the linear actuator, and the output direction of the linear actuator; and, a correction unit configured to correct the control amount by using the correction gain.

Further features of the present invention will become apparent from the following description of embodiments with reference to the attached drawings.

BRIEF DESCRIPTION OF THE DRAWINGS

FIGS. 8A and 8B are diagrams that show open output characteristics in a control system.

DESCRIPTION OF THE EMBODIMENTS

First Embodiment

Figure 1:
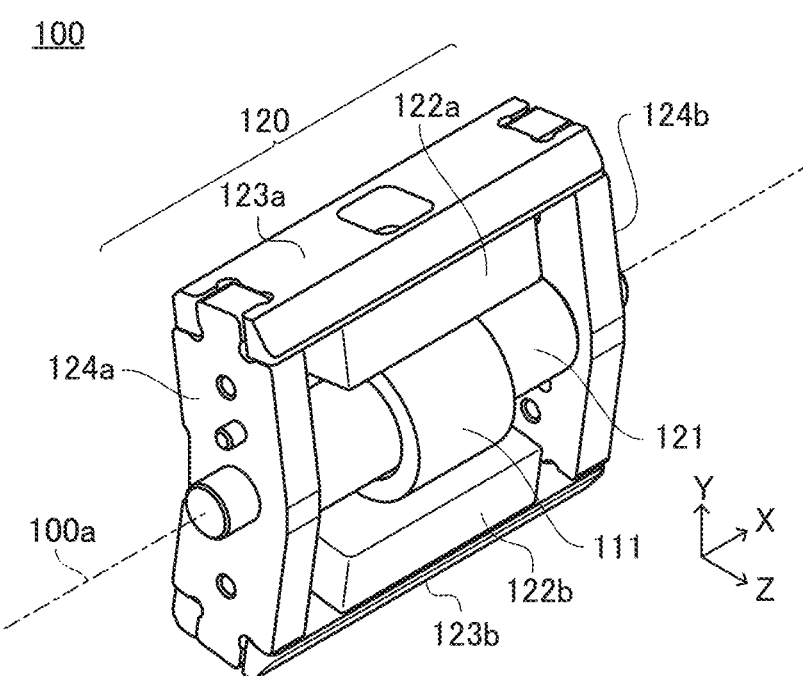
FIG. 1 is a diagram that shows the configuration of a linear actuator.

First, a configuration and features of a linear actuator of a unipolar type, which is the control target, will be explained. FIG. 1 is a diagram showing the configuration of the linear actuator. A linear actuator 100 is a linear direct current motor provided with a coil and a field magnet unit, and is configured to drive a load by generating thrust in a predetermined direction. A load is the drive target object, and in the present embodiment, although an example in which a focus lens of an image capturing apparatus serves as the load (drive target object) is explained, the load (drive target object) is not limited thereto.

The linear actuator 100 is a compact-sized linear direct current motor of a unipolar type A linear direct current motor is a driving apparatus that moves a load (drive target object) at high speed. The linear actuator 100 can complete positioning in a short time while moving the load (drive target object) at high speed, and can follow the target value with high accuracy even during movement.

The linear actuator 100, which is a linear direct current motor of a unipolar type, is provided with a coil 111 and a field magnet unit 120. The electromagnetic interaction between the coil 111 and the field magnet unit 120, that is, the generation of a Lorentz force within the coil 111, drives the load (drive target object) (not shown) by generating thrust in a direction substantially parallel to a main axis 100*a*. That is, the linear actuator 100 drives the load (drive target object) attached to the linear actuator 100 by driving the main axis 100*a* as a guide rail. It should be noted that, in FIG. 1 and FIG. 2, the X-axis is parallel to the main axis 100*a*. The Y-axis is the axis that becomes parallel to the vertical direction when the Z-axis is aligned parallel to the horizontal direction. The Z-axis is the axis that is orthogonal to both the X-axis and the Y-axis.

The coil 111 is, for example, an air-core coil of a cylindrical shape. An air-core coil of a cylindrical shape is configured by tightly winding typical enameled wire and the like into a circular shape. When the coil 111 is energized, current flows in the circumferential direction of the cylindrical shape. By applying a magnetic field in a direction orthogonal to the current in the circumferential direction, that is, in the radial direction corresponding to the magnetic field in the interlinkage direction based on the winding core, which is the central axis of the cylindrical shape, a Lorentz force is generated in the direction orthogonal to both the circumferential current and the magnetic field, in the central axis direction. The linear actuator 100 uses the generated Lorentz force as thrust. The main axis 100*a* in the linear actuator 100 coincides with the winding core, which is the central axis of the coil 111.

The field magnet unit 120 forms a magnetic field in the interlinkage direction that acts on the coil 111 to generate Lorentz force. The field magnet unit 120 comprises permanent magnets (permanent magnet 122*a*, and permanent magnet 122*b*) and yokes (yoke 121, yoke 123*a*, yoke 123*b*, yoke 124*a*, and yoke 124*b*). The permanent magnet 122*a* and the permanent magnet 122*b* are, for example, typical unidirectionally magnetized permanent magnets. The permanent magnet 122*a* and the permanent magnet 122*b* are each disposed on the outside (opposite side of the winding core) with respect to coil 111 and are arranged facing each other, with their principal magnetization directions closely aligned with the direction of the winding core. The permanent magnet 122*a* and the permanent magnet 122*b* are arranged facing each other, with the coil 111 arranged therebetween, thereby forming a magnetic field in the interlinkage direction necessary to generate the Lorentz force.

Yoke 121, yoke 123*a*, yoke 123*b*, yoke 124*a*, and yoke 124*b* form a closed magnetic circuit for the magnetic flux of the permanent magnet 122*a* and the permanent magnet 122*b*. By forming a closed magnetic flux path by the yokes, the efficiency of the linear actuator 100 is increased by strengthening the magnetic field acting on the coil 111. Yoke 121, yoke 123*a*, yoke 123*b*, yoke 124*a* and yoke 124*b* are formed of, for example, a material having a high saturation magnetic flux density, such as soft iron. Yoke 121 extends in the winding core direction inside the coil 111. Yoke 123*a*, yoke 123*b*, yoke 124*a* and yoke 124*b* are disposed so as to surround the coil 111, the permanent magnet 122*a* and the permanent magnet 122*b*. Yoke 123*a* is disposed further outside (in the Y-axis direction, on the side opposite to the coil 111) than the permanent magnet 122*a*, and yoke 123*b* is disposed further outside (in the Y-axis direction, on the side opposite to the coil 111) than the permanent magnet 122*b*. That is, in a case in which the coil 111 side is assumed to be the front side in each permanent magnet, each yoke is disposed on the back surface of each permanent magnet. Yoke 124*a* is disposed so as to connect to the end of yoke 123*a*, and yoke 124*b* is disposed so as to connect to the end of yoke 123*b*. The main axis 100*a* penetrates near the center of yoke 124*a* and yoke 124*b*. Yokes that are disposed in this manner form a closed magnetic path for the magnetic flux of the permanent magnet 122*a* and the permanent magnet 122*b*, and serve to strengthen the magnetic field acting on the coil 111, thereby increasing the efficiency of the linear actuator 100.

The coil 111 is capable of moving freely relative to the yokes 121, which extend on the inner side in the direction of the main axis 100*a*, along the direction of the main axis 100*a*. In addition, the coil 111 is surrounded in the direction of the main axis 100*a* by yoke 124*a* to the front and yoke 124*b* to the rear, and a finite stroke range is determined. Therefore, in the linear actuator 100, when the coil 111 is in a position precisely midway between yoke 124*a* to the front and yoke 124*b* to the rear along the main axis 100*a*, the position of the coil 111 can be deemed to be near the central part of the stroke. Similarly, when the coil 111 is in a position close to either yoke 124*a* to the front or yoke 124*b* to the rear along the main axis 100*a*, the position of the coil 111 can be deemed to be near a stroke end part. Hereafter, the state in which the center of gravity of the coil 111, in the direction of the main axis 100*a*, is positioned in the center between the inner wall surfaces of yoke 124*a* and yoke 124*b* corresponds to the state of being in a center position of the stroke, and the state at the center position of the stroke is defined as the origin O, at which the stroke amount is zero. In addition, in the direction of the main axis 100*a*, the side from the origin O on the yoke 124*a* side (in the −X direction) is made the negative side, and the side from the origin O on the yoke 124*b* side (in the +X direction) is made the positive side. In addition, the maximum stroke amount (absolute value) at the position of the stroke end part on the negative side is defined as x−max, and the maximum stroke amount (absolute value) at the position of the stroke end part on the positive side is defined as x+max.

In the linear actuator 100, the measure of efficiency can be expressed as the average interlinkage (effective) magnetic flux density Bv, derived from integrating and averaging the magnetic flux density of the interlinkage direction for generating Lorentz force in each part of coil 111 over the entire coil. "v" denotes "valid". The reason the average interlinkage magnetic flux density Bv can express the measure of efficiency of the linear actuator 100 is that the current flowing through the coil 111 is uniform if viewed macroscopically. Then, the product of the average interlinkage magnetic flux density Bv, the current flowing through the coil, and the total length of the conductive wire of the coil part becomes the thrust of the linear actuator 100. Therefore, the average interlinkage magnetic flux density Bv is a proportional constant of the thrust of the linear actuator 100, and the product of this constant with the total length of the conductive wire of the coil part corresponds to what is known as the thrust constant of the electromagnetic linear motor.

Figure 2A:
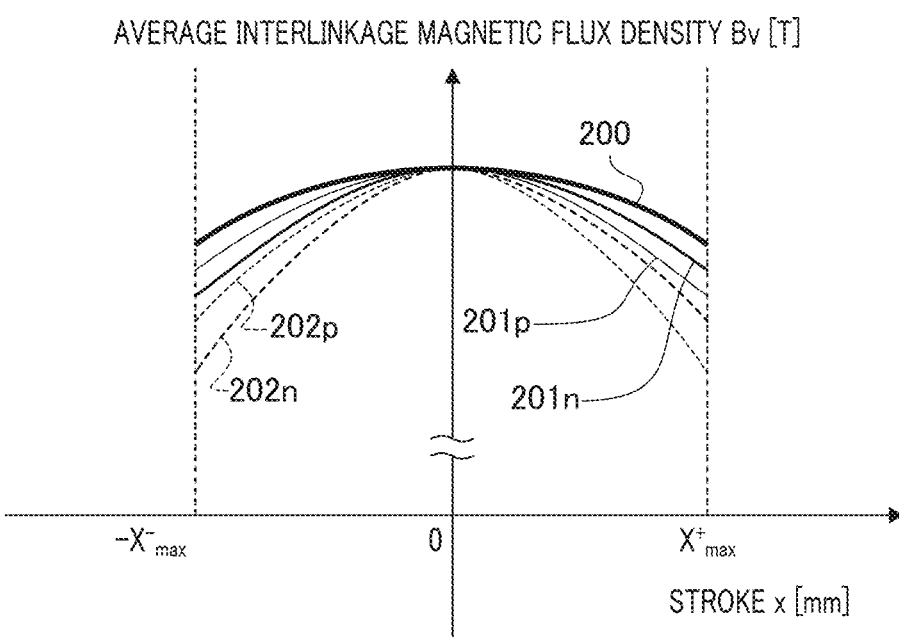
FIGS. 2A and 2B are diagrams explaining the characteristics of a linear actuator.
Figure 2B:
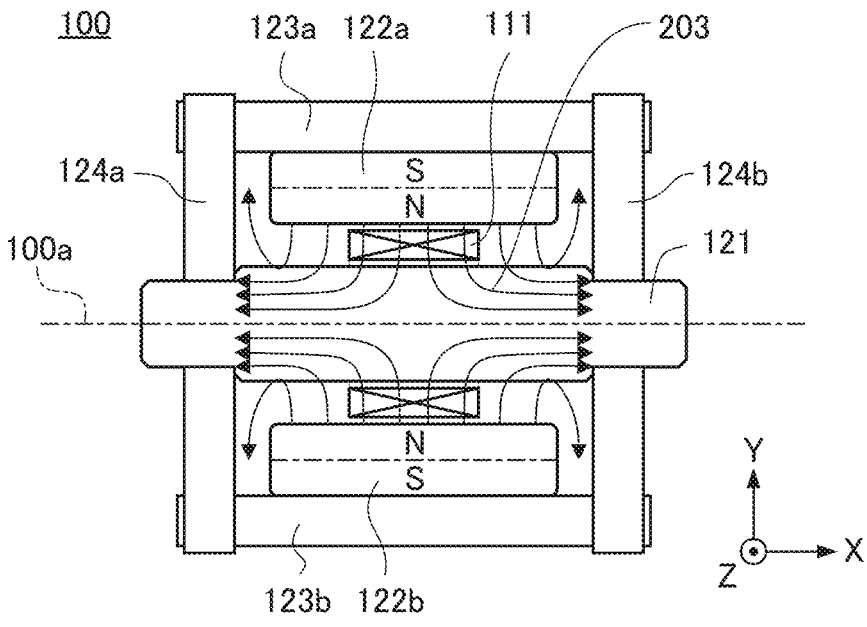

FIGS. 2A and 2B are diagrams explaining the characteristics of a linear actuator. FIG. 2A is a graph showing profiles of the average interlinkage magnetic flux density of a linear actuator, which is a unipolar-type linear direct current motor. The vertical axis of the graph indicates the average interlinkage magnetic flux density Bv acting on the coil, corresponding to the output characteristics of the linear actuator 100. The horizontal axis of the graph indicates the stroke position of the linear actuator 100. The graph shows the average interlinkage magnetic flux density Bv of each output level and output direction of the linear actuator 100. Hereafter, the stroke position of the linear actuator 100 on the horizontal axis of the graph is referred to as the first parameter, the output level of the linear actuator 100 is referred to as the second parameter, and the output direction of the linear actuator 100 is referred to as the third parameter.

A characteristic 200 is the characteristic of a state in which the output is zero (when under no load). A characteristic 201p is the characteristic of a state during which there is low-level output and the output is in the positive stroke direction. It should be noted that "p" denotes "positive". A characteristic 201n is the characteristic of a state at the time at which there is low-level output and the output is in the negative stroke direction. It should be noted that "n" denotes "negative". A characteristic 202p is the characteristic of a state at the time at which there is high-level output and the output is in the positive stroke direction. A characteristic 202n is the characteristic of a state at the time at which there is high-level output and the output is in the negative stroke direction.

As shown in FIG. 2A, because the sign of the average interlinkage magnetic flux density is constant over an entire stroke, the linear actuator 100 of the present embodiment also has a constant polarity of the average interlinkage magnetic flux density acting on the coil 111. In addition, there is no extreme periodic fluctuation of the average interlinkage magnetic flux density Bv during the stroke. These features are unipolar-type features, and due to these features, in addition to being able to configure the motor to be compact, it is possible to easily perform drive control without the need to switch the energization method or the like for the coil 111 according to the stroke position. Furthermore, the advantage of low thrust ripple is also obtained. Such a linear direct current motor of a unipolar type is commonly referred to as a linear actuator. Therefore, the linear actuator 100 is a linear direct current motor of a unipolar type in which the polarity of the average interlinkage magnetic flux acting on the coil 111 is constant within a finite stroke range.

In addition, as shown in FIG. 2A, in the linear actuator 100, the average interlinkage magnetic flux density Bv is highest at a position near the center of the stroke, whereas the average interlinkage magnetic flux density Bv becomes lower toward the stroke end parts on both sides. That is, in the linear actuator 100, the thrust constant becomes large at a position near the center of the stroke, and the thrust constant becomes small toward the stroke end parts. This is because the magnetization of the yokes of the field magnet unit 120 is not infinite but saturates.

FIG. 2B is a diagram explaining magnetic flux in the linear actuator 100. In FIG. 2B, a cross-section in the XY plane of the linear actuator 100 and the magnetic flux are shown schematically. The magnetic flux 203 indicated by the arrows shows the flow of the magnetic flux formed by the field magnet unit 120. The magnetic flux 203 flows through the yoke 121 by entering and exiting from the permanent magnet 122a and the permanent magnet 122b.

In the yoke 121, the region near the center of the stroke has low magnetization, whereas moving towards both ends from the region near the center of the stroke, the magnetization becomes stronger because the magnetic flux 203 flowing into the yoke 121 from the permanent magnet 122a and the permanent magnet 122b is integrated. Therefore, the magnetization of the yoke 121 reaches saturation partway through the stroke, and the magnetic flux 203 from the permanent magnet 122a and the permanent magnet 122b does not enter near the stroke end parts thereafter and disperses into the surrounding area. Near the stroke end parts, the magnetic flux 203 does not act in an effective orientation (interlinkage direction) on the coil 111, and the average interlinkage magnetic flux density Bv decreases toward the stroke end parts.

Due to the decrease in the average interlinkage magnetic flux density at the stroke end parts, a decrease in rated output due to a deterioration in efficiency, an increase in idle power consumption, and the like occurs. Furthermore, because a difference in output characteristic occurs between the stroke center part and the stroke end parts, for example, in scenarios in which positioning control is performed by driving a drive target object at high speed between these positions and the like, the time required for positioning increases and the tracking performance during movement deteriorates. Therefore, in the present embodiment, in order to reduce the influence caused by the difference in output characteristics between the stroke center part and the stroke end parts, a correction is performed by using a correction gain for the drive amount of the linear actuator 100.

Here, as shown in FIG. 2A, the average interlinkage magnetic flux density Bv in the linear actuator 100 varies not only with the stroke position but also with the output level and the direction of the output. For example, the average interlinkage magnetic flux density Bv becomes lower toward the stroke end parts at the time at which there is low-level output shown in the characteristic 201p and the characteristic 201n than when under no load shown in the characteristic 200. Furthermore, the average interlinkage magnetic flux density Bv becomes lower toward the stroke end parts at the time at which there is high-level output shown in the characteristic 202p and the characteristic 202n than at the time at which there is low-level output. That is, at the same stroke position, as the output level becomes higher, the average interlinkage magnetic flux density Bv lowers, and the efficiency decreases.

In addition, the average interlinkage magnetic flux density Bv becomes lower on the positive side of the stroke for the characteristic 201p and on the negative side of the stroke for the characteristic 201n than on the negative side of the stroke for characteristic 201p (left half of the graph) and on the positive side of the stroke for the characteristic 201n (right half of the graph) at the time of low-level output. In addition, a similar tendency is observed even at the time of high-level output. That is, this means that even at the same stroke position and output level, the average interlinkage magnetic flux density Bv becomes lower, and efficiency decreases when the direction of output faces from the center part side towards the end part sides of the stroke, in the so-called divergent direction, compared to when the direction of output faces in the opposite, so-called convergent direction.

These phenomena of reduced efficiency are caused by the saturation of the magnetization of the yokes of the field magnet unit 120, similar to the changes caused by the stroke. When the coil 111 is energized to output thrust, the yokes are also magnetized by the magnetic field formed by the coil 111. At this time, due to the two types of thrust output directions, forward and reverse, of the coil 111, the magnetization by the coil 111 can be divided into a case in which magnetization weakens the magnetization by the existing permanent magnets (permanent magnet 121*a* and permanent magnet 121*b*), and a case in which magnetization strengthens the magnetization by the existing permanent magnets. The case in which magnetization is weakened corresponds to the output in the convergent direction, and the case in which magnetization is strengthened corresponds to the output in the divergent direction. Then, in the case in which the magnetization by the coil 111 is the direction that strengthens the magnetization by the existing permanent magnets, because the yokes progress more quickly towards saturation, the proportion of magnetic flux from the permanent magnets that disperses into the surroundings increases, and both the average interlinkage magnetic flux density Bv and efficiency further decrease. In the case in which the output of the linear actuator 100 is in the divergent direction, because the average interlinkage magnetic flux density Bv drops and efficiency decreases more than in the case of output in the convergent direction, the correction gain used in the correction of the control amount is increased as compared to the gain used in the convergent direction. Therefore, in the case of attempting to reduce the influence caused by output characteristic differences by performing corrections when controlling the drive of the linear actuator 100, it is desirable to perform these corrections by considering not only the stroke position in the linear actuator, but also the level and direction of the output. Thereby, the influence of output characteristic differences due to output direction and output level can be reduced.

Figure 3:
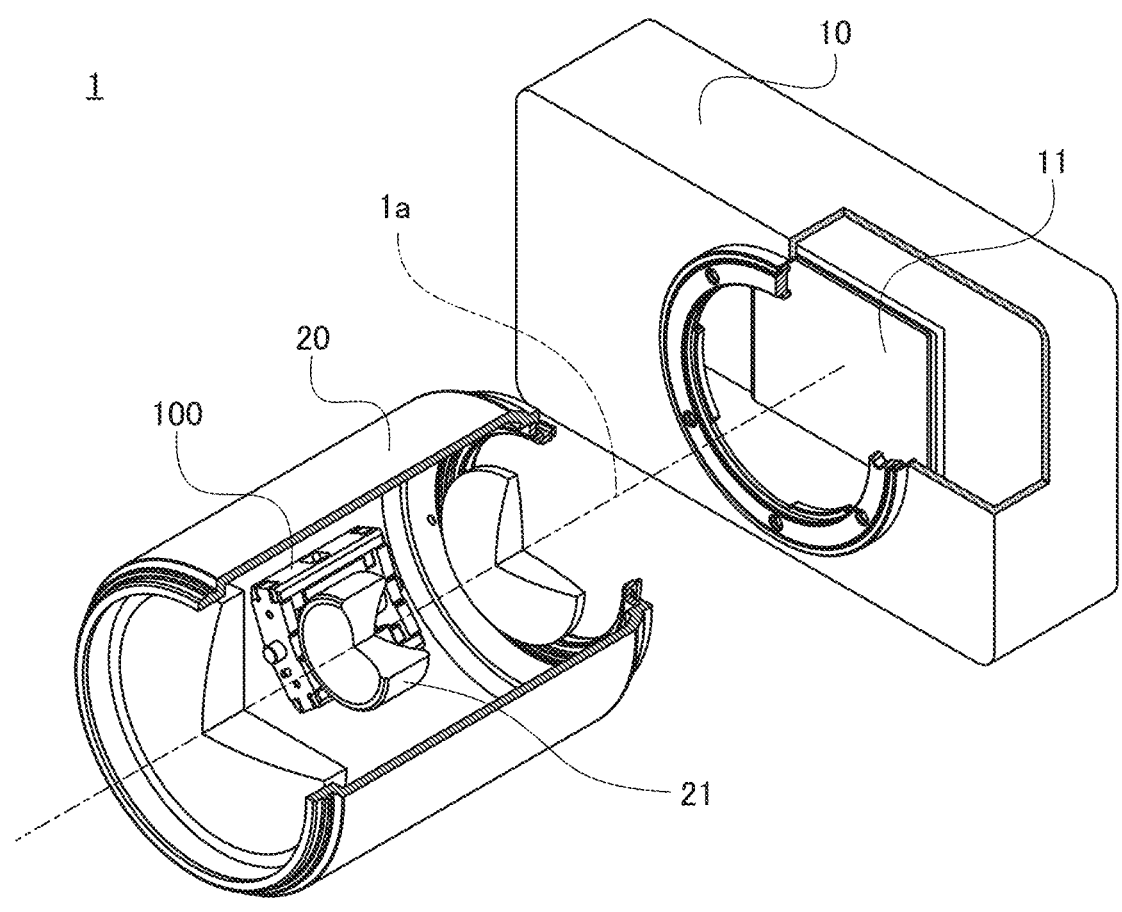
FIG. 3 is a diagram that shows the configuration of a camera system configured to use a linear actuator.

Here, an example in which the linear actuator 100 is used in an apparatus will be explained. FIG. 3 is a diagram that shows the configuration of a camera system configured to use a linear actuator. A camera system 1 is an apparatus for capturing still images and moving images. A camera system 1 includes a camera body 10 provided with an image sensor 11, which corresponds to an image capturing unit, and an interchangeable lens 20 provided with a lens group. The lens group provided by the interchangeable lens 20 includes a focus lens 21 for performing focus adjustment. The linear actuator 100 is used as a driving unit for moving the focus lens 21 in the direction of an optical axis 20*a* of the image capturing optical system of the interchangeable lens 20. That is, the load (drive target object) of the linear actuator 100 becomes the focus lens 21. In order to move the focus lens 21 in the direction of the optical axis 20*a* by the linear actuator 100, the linear actuator 100 is disposed in the interchangeable lens 20 so that the main axis 100*a* of the linear actuator 100 becomes parallel to the optical axis 20*a*.

The image sensor 11 is an image capturing element configured to generate image data by photoelectric conversion of the optical image of the subject formed via the image capturing optical system. The image sensor 11 is, for example, a sensor that performs photoelectric conversion, such as CMOS or CCD. In the camera system 1, an image is formed on the image capturing surface of the image sensor 11 by focusing the light flux from the subject by the image capturing optical system of the interchangeable lens 20. Then, the optical image of the subject formed via the image capturing optical system is extracted as an electrical signal by photoelectric conversion by the image sensor 11, and various processes are performed on the signal so as to generate image data, thereby acquiring an image.

In the image capturing optical system, the light flux of the target to be formed on the image capturing surface of the image sensor 11 in a single state is limited to that of a predetermined distance (focus position) from the camera system 1. Light flux from distances other than this predetermined distance does not form an image on the image capturing surface of the image sensor 11, and the image that is captured becomes what is termed a "blurred" or "out of focus" image. The lens group provided by the interchangeable lens 20 includes a focus lens 21 capable of adjusting the focal distance, and by moving the focus lens 21 back and forth in the optical axis 20*a* direction, it is possible to change the distance (focus position) of the light flux of the target to be image captured.

In the camera system 1, the position of the subject is detected by a distance-measuring unit (not shown) or the like, and by moving and adjusting the focus lens 21 in the optical axis 20*a* direction according to the detection results, it is possible to focus on and capture images of subjects at various distances, from very close up to infinity. Such movement in the camera system 1 is called "focusing", and focusing is implemented by moving the focus lens 21 in the optical axis 20*a* direction. The driving unit of the focus lens 21 of the camera system 1, in addition to being compact, is required to drive the focus lens 21 at high speed in order to realize comfortable photography, complete positioning to the target position in a short period, and maintain high precision in following the subject even while moving. Therefore, the linear actuator 100, which is a unipolar-type linear direct current motor, is used as the driving unit to drive the focus lens 21. The linear actuator 100 drives a lens, such as the focus lens 21, that is part of the lens group that configures the image capturing optical system, along the main axis 100*a*, which is parallel to the optical axis 20*a* of the image capturing optical system. It should be noted that in the present embodiment, an example in which the linear actuator 100 is used to drive the focus lens 21 has been explained, however the invention is not limited thereto. In addition, although an example in which the lens apparatus is detachable from the camera body as the camera system 1 has been explained, the lens apparatus may also be an image capturing device in which the camera body and the lens are integrated, or the lens apparatus may be a camera module or the like that has been modularized for incorporation into other apparatuses.

Figure 4:
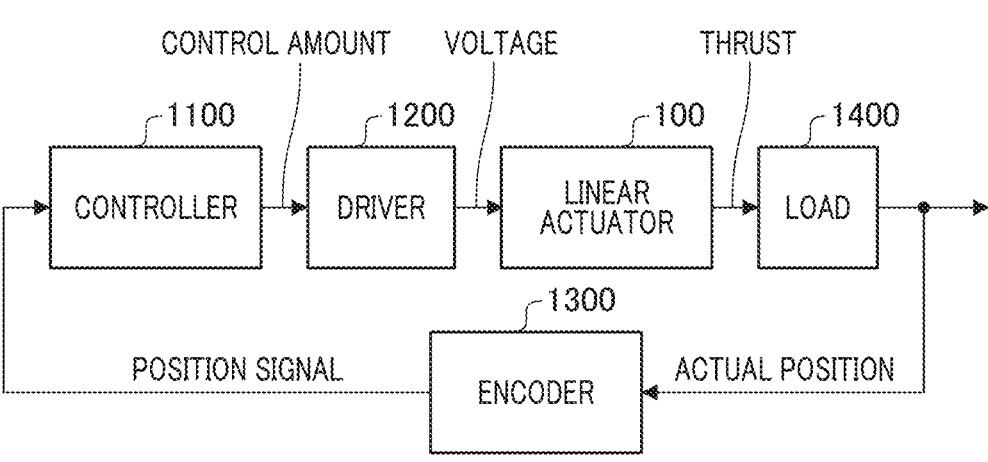
FIG. 4 is a diagram that shows the configuration of a control system.

FIG. 4 is a diagram that shows the configuration of a control system of a linear actuator. A control system 1000 comprises the linear actuator 100, which is the control target, a controller 1100, a driver 1200, and an encoder 1300. A load 1400 is the load that is the drive target object driven by the linear actuator 100. In the example shown in FIG. 3, the structure that includes the focus lens 21 of the camera system 1 corresponds to the load 1400.

The linear actuator 100 comprises the coil 111 and the field magnet unit 120, with one of the coil 111 and the field magnet unit 120 denoted as the reference drive side and the other as the driven side, each moving relative to the other in the main axis 100*a* direction. The driven side is integrally fixed with the load 1400. In this manner, thrust is transmitted from the reference drive side to the load 1400 of the driven side by the linear actuator 100, and the load 1400 is driven in the main axis 100*a* direction of the linear actuator 100.

The controller 1100 is a control unit configured to perform drive commands and control calculations of the load 1400 and the linear actuator 100. The controller 1100 determines the sequential drive target amounts (position and speed) of the load 1400 or the linear actuator 100, and accordingly communicates the control amount to the driver 1200 in order to drive the linear actuator 100. The control performed by the controller 1100 is primarily centered on feedback control. Therefore, the controller 1100 sequentially acquires position information of the load 1400 or the linear actuator 100 from the encoder 1300 and determines the control amount so as to bring the difference (deviation) from the drive target amounts closer to zero.

The driver 1200 drives the linear actuator 100. Specifically, the driver 1200 applies voltage to the coil 111 and supplies power based on the control amount from the controller 1100 so that the linear actuator 100 generates thrust that is approximately proportional to the control amount from the controller 1100. The driver 1200 uses a method such as the Pulse Width Modulation (PWM) method at a predetermined duty ratio or the variable linear regulator method in order to apply a voltage in which the direct current component is proportional to the control amount.

The encoder 1300 detects the position information of either the load 1400 or the linear actuator 100 and transmits this position information to the controller 1100. Because the driven side of the linear actuator 100 and the load 1400 are fixed together, if the position of either the load 1400 or the linear actuator 100 is detected, the position of the other can be indirectly determined. Therefore, in the control configuration of the present embodiment, it does not matter whether the encoder 1300 detects the position of the load 1400 or the position of the linear actuator 100.

Figure 5:
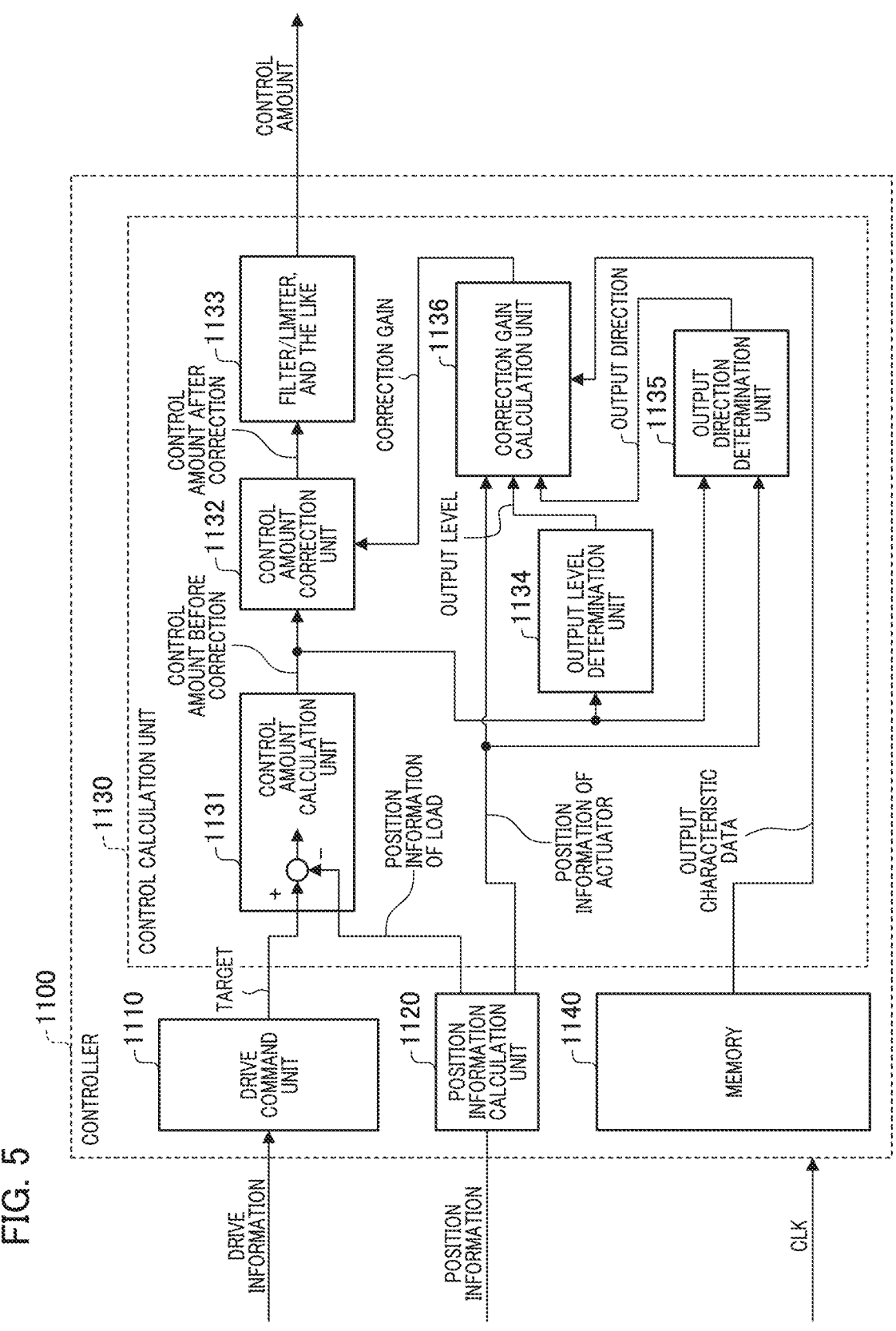
FIG. 5 is a diagram that shows the configuration of a controller of a control system.

FIG. 5 is a diagram that shows the configuration of a controller of a control system. The controller 1100 includes a drive command unit 1110, a position information calculation unit 1120, a control calculation unit 1130, and a memory 1140. In addition, as a hardware configuration, the controller 1100 includes, for example, a CPU (Central Processing Unit), non-volatile memory such as ROM (Read Only Memory), and volatile memory such as RAM (Random Access Memory). The ROM stores a program. The RAM serves as a temporary storage area, such as a main memory or a work area of the CPU. The RAM includes the memory 1140. The functions of the drive command unit 1110, the position information calculation unit 1120, and the control calculation unit 1130 are realized by the CPU executing a program stored in the ROM.

The drive command unit 1110 determines sequential drive target values related to the position or speed of the load 1400, which is the drive target object, and communicates these target values to the control calculation unit 1130. The drive command unit 1110 acquires the drive information necessary to determine the drive target values of the load 1400, and, based on external commands or calculations performed locally, determines the sequential drive target values related to the position or speed of the load 1400. Drive information in the camera system 1, for example, is the distance information to the subject, which is the distance measurement result measured by the distance-measuring unit that measures the distance to the subject. The drive command unit 1110 in the camera system 1 acquires the distance information to the subject as drive information and, based on the distance information, determines the sequential target positions of the focus lens 21, which corresponds to the load 1400, as the drive target values. The drive command unit 1110 in the camera system 1 corresponds to the processing content in the main control unit of the interchangeable lens 20.

The position information calculation unit 1120 is a position calculation unit that acquires the position information of either the load 1400 or the linear actuator 100 from the encoder 1300, calculates the current position information of both the load 1400 and the linear actuator 100 and outputs this information to the control calculation unit 1130. The position information calculation unit 1120 in the camera system 1 acquires the position information of either the focus lens 21 or the linear actuator 100 from the encoder 1300, and calculates the current position information of both the focus lens 21 and the linear actuator 100. It should be noted that because the driven side of the linear actuator 100 and the load 1400 are fixed together, the position information calculation unit 1120 can calculate the position information of one of the load 1400 and the linear actuator 100 based on the position information of the other.

The memory 1140 stores the output characteristics of the linear actuator 100 as data for calculating correction gain to correct the output characteristics of the linear actuator 100. The output characteristics of the linear actuator 100 stored by the memory 1140 are used in the control calculation unit 1130 to calculate a correction gain for correcting the control amount of the linear actuator 100.

The control calculation unit 1130 performs control calculations, such as feedback control so as to bring the difference (deviation) between the drive target values and the current position information of the load 1400 close to zero, and various filter processing and the like, and determines the control amount of the actuator 100. In addition, the control calculation unit 1130 of the present embodiment corrects the control amount calculated based on the drive target values and the position information of the load 1400 by using the correction gain. The correction gain is determined based on the stroke position, the output level, and the output direction of the linear actuator 100.

The control calculation 1130 includes a control amount calculation unit 1131, a control amount correction unit 1132, a filter/limiter and the like 1133, an output level determination unit 1134, an output direction determination unit 1135, and a correction gain calculation unit 1136. The control amount calculation unit 1131 performs calculations related to the main control amount, determines the control amount from the deviation input, and the like, and outputs this determined control amount. The control amount calculation unit 1131 acquires the drive target value, which is the target position of the load 1400, from the drive command unit 1110, and the current position information of the load 1400 from the position information calculation unit 1120. Then, the control amount calculation unit 1131 calculates the control amount so as to bring the difference (deviation) between the drive target value and the current position information close to zero. The control content in the control amount calculation unit 1131 includes, for example, feedback control represented by PID control, and feedforward control, in addition to offset calculations and gain calculations and the like for various corrections. The control calculation unit 1130 outputs the calculated control amount to the control amount correction unit 1132. It should be noted that the control amount output by the control calculation unit 1130 to the control amount correction unit 1132 is the control amount before correction by the control amount correction unit 1132 is performed.

The control amount correction unit 1132 performs a correction on the control amount calculated by the control calculation unit 1130 by using a correction gain. Then, the control amount correction unit 1132 outputs the corrected control amount, for which the correction has been performed, to the filter/limiter and the like 1133. The correction gain used by the control amount correction unit 1132 is calculated by the correction gain calculation unit 1136. Details of the calculation of the correction gains will be described below. The correction gain calculation unit 1136 determines correction gain by sequentially performing calculations, and sets this determined correction gain as the value for use by the control amount correction unit 1132.

The filter/limiter and the like 1133 performs predetermined filtering processing and limiter processing on the corrected control amount acquired from the control amount correction unit 1132, and determines the control amount to be output to the driver 1200. It should be noted that the calculations related to the control amount are not limited to the configuration explained above. The control amount correction unit 1132 may be configured to correct the control amount for the output characteristic difference of the linear actuator 100 serially by using a correction gain, and may perform other operations in a different order, or add other different operations therebetween.

Here, the calculation of the correction gain will be explained. In the present embodiment, the correction gain is determined by considering the stroke position, the output level, and the output direction, which are three factors that influence the output characteristics of the linear actuator 100. Therefore, the correction gain calculation unit 1136 acquires at least three parameters related to stroke position, output level, and output direction, and calculates the correction gain. In the following, the stroke position of the linear actuator 100 will be explained as the first parameter, the output level of the linear actuator 100 as the second parameter, and the direction of output of the linear actuator 100 as the third parameter.

The first parameter is the stroke position, that is, the position information of the linear actuator 100. The correction gain calculation unit 1136 acquires the position information of the linear actuator 100 from the position information calculation unit 1120. The position information is represented by the stroke position, with the center position in the stroke direction set to zero, and wherein positive values are assigned to positions forward from the center position and negative values to positions backward from the center position. In the feedback control system, the stroke position becomes one of the parameters because the correction gain is adjusted according to the stroke position so as to cancel the variations in the thrust constant due to the stroke. As shown in FIG. 2A, the thrust constant varies with the stroke position, and particularly at the stroke end parts, there is a need to increase the correction gain.

The second parameter is the output level of the linear actuator 100. The correction gain calculation unit 1136 acquires the output level of the linear actuator 100 from the output level determination unit 1134. The output level determination unit 1134 determines the output level based on the control amount before correction acquired from the control amount calculation unit 1131. For example, because the linear actuator 100 outputs a thrust approximately proportional to the control amount before correction, the output level determination unit 1134 may output the absolute value (ABS) of the control amount before correction as the output level to the correction gain calculation unit 1136. It should be noted that the output level may be a level value that is the absolute value (ABS) of the control quantity before correction, discretized into predetermined steps.

The third parameter is the direction of the output of the linear actuator 100. The correction gain calculation unit 1136 acquires the direction of output from the output direction determination unit 1135. The output direction determination unit 1135 encodes (SIGN) the control amount before correction acquired from the control amount calculation unit 1131, and the output direction determination unit 1135 further determines the output direction by referring to the position information (stroke position) of the linear actuator

100 acquired from the position information calculation unit 1120. The output direction determination unit 1135 determines whether the output direction is in a converging direction or a diverging direction, and outputs the determination result to the correction gain calculation unit 1136. Due to the influence of magnetization saturation, it is necessary to increase the correction gain more during the output from the center to the end parts in the output direction than during the output from the end parts to the center in the converging direction.

The correction gain calculation unit 1136 calculates and determines the correction gain by using at least the three parameters of the stroke position of the linear actuator 100, the output level of the linear actuator 100, and the output direction of the linear actuator 100. That is, the correction gain calculation unit 1136 calculates the correction gain based on the position information calculation result from the position information calculation unit 1120, the output level determination result from the output level determination unit 1134, and the output direction determination result from the output direction determination unit 1135.

In the present embodiment, the correction gain is a gain that maintains the thrust constant of the linear actuator 100 so as to be constant in any state. That is, the correction gain may be set such that the product with the average linkage magnetic flux density always becomes constant. In addition, to ensure that the content of original feedback control in the control amount calculation unit 1131 is not influenced, for example, the correction gain may be set so that the value in the state of the stroke center position when under no load is 1. Here, the average interlinkage magnetic flux density at the stroke center position in the no-load state of the linear actuator 100 is denoted as $B_0$, and the average interlinkage magnetic flux density in each state is denoted as B. The correction gain $G_C$ (wherein "C" is an abbreviation for "correction") can be obtained by the following equation (1):

[Equation 1]

$$G_c = B_0/B \qquad (1)$$

Thus, if the product of the reciprocal of the average interlinkage magnetic flux density $1/B$ multiplied by a constant value $B_0$ is stored as output characteristic data in the memory 1140 for each state of the linear actuator 100, the correction gain $G_C$ can be obtained by referring to this output characteristic data. Therefore, in the memory 1140, an output characteristic data group, which is the product of the reciprocal of the average interlinkage magnetic flux density $1/B$ multiplied by a constant value $B_0$ in each state of the linear actuator 100, is stored. The correction gain calculation unit 1136 acquires the output characteristic data from the memory 1140 and uses this data to calculate the correction gain.

A method of storing and a method of estimating the reciprocal $1/B$ of the average interlinkage magnetic flux density of the linear actuator 100 may be, for example, taking the reciprocal of a known profile of the average interlinkage magnetic flux density, as previously shown in FIG. 2A, and the reciprocal of the profile may be function approximated. This is because the profile of the average interlinkage magnetic flux density in the unipolar-type linear actuator 100 becomes a continuous shape that can be accurately approximated by second- or fourth-order polynomials, as shown in FIG. 2A.

Figure 6A:
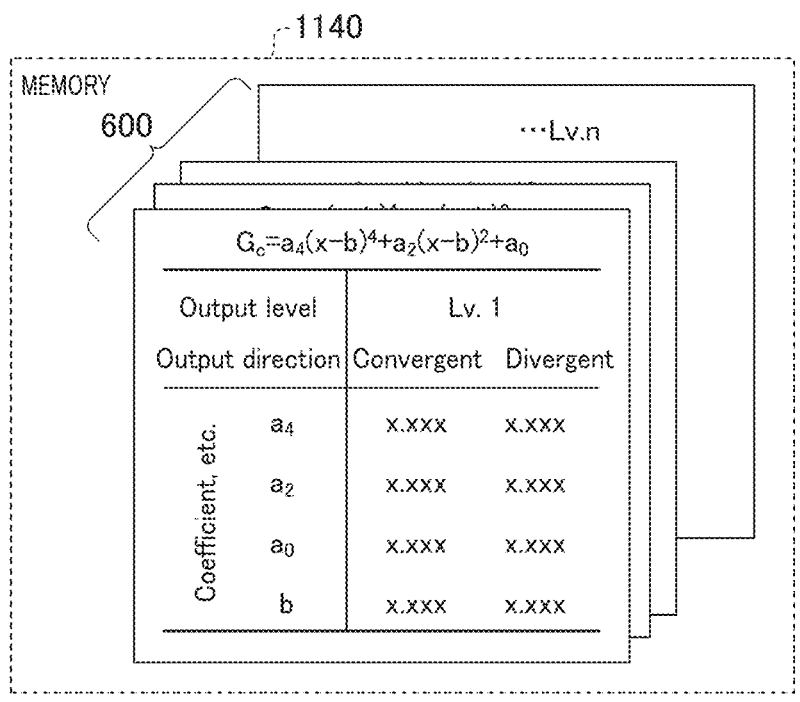
FIGS. 6A and 6B are diagrams explaining a storage method of a first example of output characteristic data of a linear actuator.
Figure 6B:
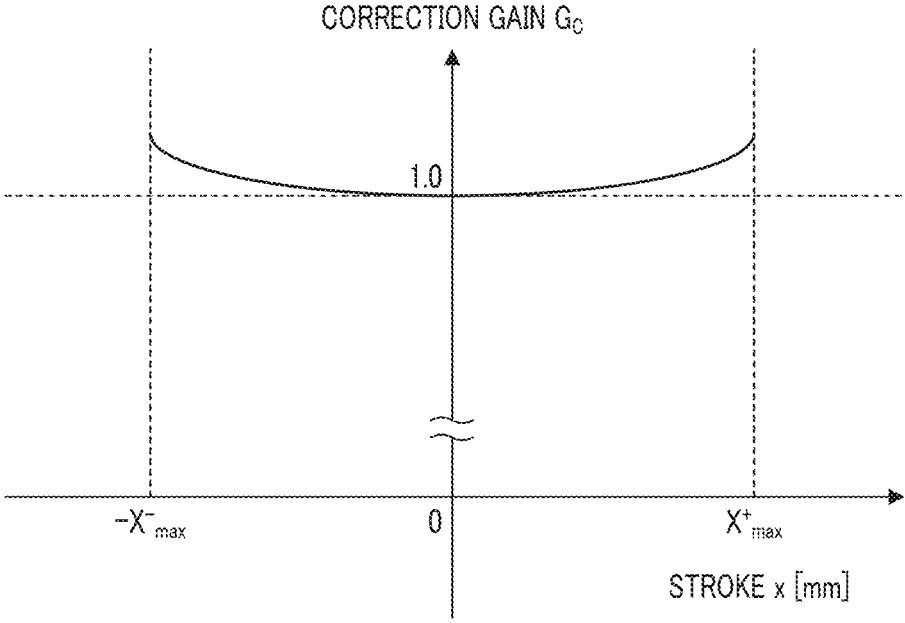

FIGS. 6A and 6B are diagrams explaining an example of output characteristic data. FIG. 6A is a diagram showing an example of an output characteristic data group that is stored in memory 1140. FIG. 6B is a diagram showing the correction gain $G_C$ estimated by using the output characteristic data. As shown in FIG. 6B, the correction gain $G_C$ is represented as a continuous function through function approximation. As shown in FIG. 6A, for the three parameters that influence the average magnetic flux density of the linear actuator 100, function approximation is performed for each, and the coefficients (such as $a_0$) and offset value (b) and the like are stored in the memory 1140 as output characteristic data 600. That is, the output characteristic data 600 retains the values of each coefficient of the function approximation results corresponding to each of the converging direction and diverging direction for each output level. It should be noted that the linear actuator 100 has a substantially symmetrical shape before and after the stroke center part in the direction of the main axis 100a, and because the output characteristics between these are similar, the component of odd-numbered terms in the function approximation for the linear actuator 100 is not large. Therefore, by omitting odd-numbered terms, benefits such as saving data storage space in the memory 1140 and a reduction in the calculation amount can be obtained.

If the stroke position of the linear actuator 100 is denoted as x, the correction gain $G_C$ is expressed by the following equation (2):

[Equation 2]

$$G_c = a_0 + a_2(x - b)^2 + a_4(x - b)^4 \qquad (2)$$

Here, $a_0$, $a_2$, and $a_4$ are coefficients of the function approximation results. b is the offset value of x for estimation use, and can be used, for example, for various adjustments in the actual configuration of the linear actuator 100, or for other fine-tuning. It should be noted that this offset value b can also be omitted. In the present embodiment, the output level is classified into predetermined steps, and at each of these levels, the function approximation results corresponding to each of the converging direction and diverging direction are retained. Therefore, the correction gain calculation unit 1136 selects appropriate function data from the output characteristic data 600 according to the output level and output direction among the three parameter inputs, and determines the correction gain corresponding to the stroke position by using the function data representing the selected output characteristic.

Figure 7A:
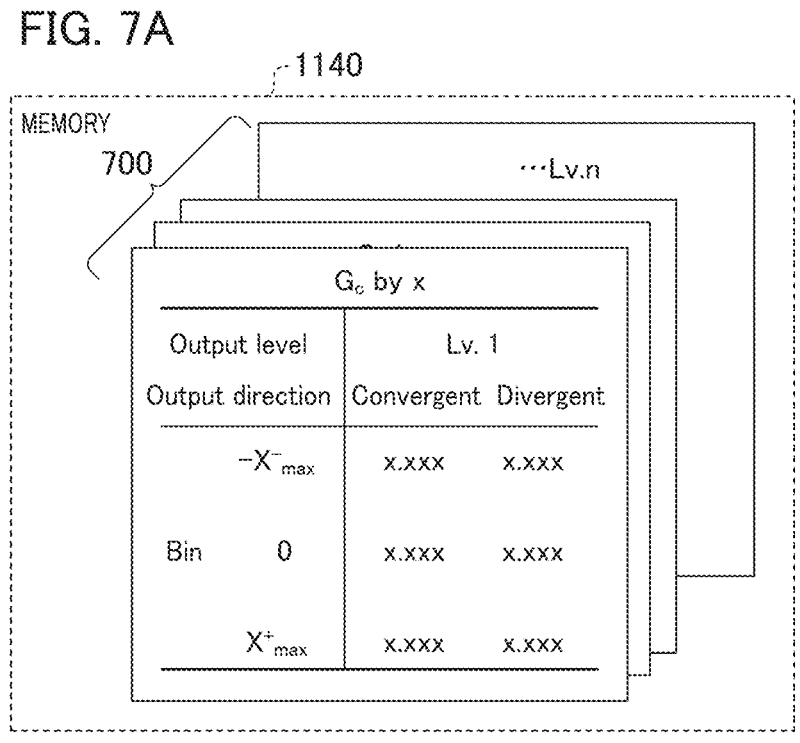
FIGS. 7A and 7B are diagrams explaining a storage method of a second example of output characteristic data of a linear actuator.
Figure 7B:
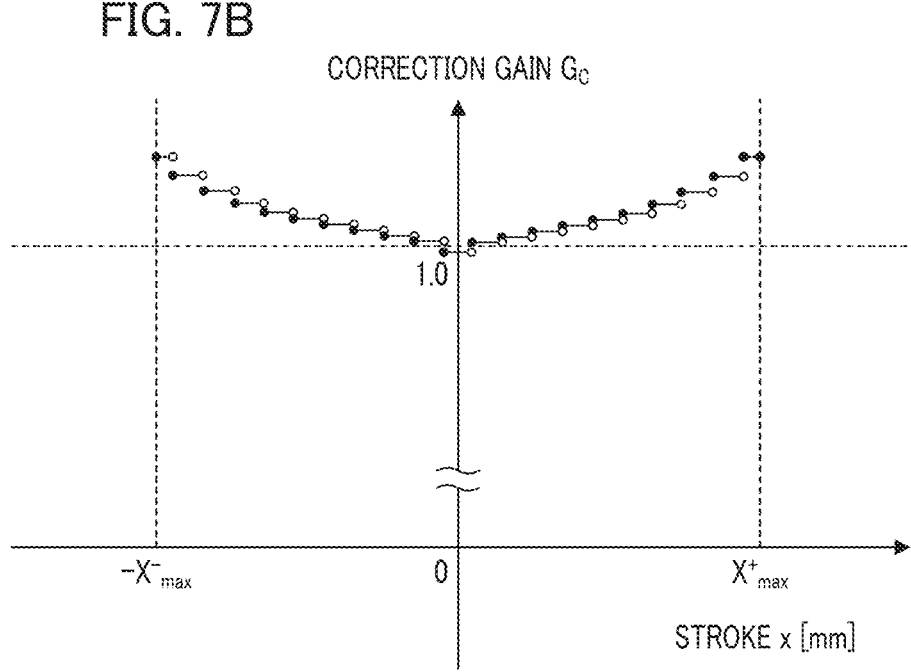

It should be noted that the output characteristic data of the linear actuator 100 may be represented as discretized direct data of each parameter. Examples of discretized output characteristic data are shown in FIGS. 7A and 7B. FIGS. 7A and 6B are diagrams explaining examples of output characteristic data. FIG. 7A is a diagram showing an example of an output characteristic data group that is stored in the memory 1140. FIG. 7B is a diagram showing the correction gain Gc that is estimated by using the output characteristic data. As shown in FIG. 7B, the correction gain $G_C$ is shown as discretized direct data. As shown in FIG. 7A, the output characteristic data 700 is held in the memory 1140 as output characteristic data 700 in a table format, with values for each bin at the predetermined stroke position x in each output level and output direction. Therefore, it is sufficient for the correction gain calculation unit 1136 to match the three parameter inputs with the table of output characteristic data 700, and select the value of the closest condition to be used as the correction gain.

As explained above, the correction gain calculation unit 1136 determines the correction gain based on the stroke position of the linear actuator 100, the output level, the output direction, and the output characteristic data, and outputs the correction gain to the control amount correction unit 1132. In the control amount correction unit 1132, the control amount calculated by the control amount calculation unit 1131 is corrected by multiplying the control amount with the correction gain determined by the correction gain calculation unit 1136. The operation of the controller 1100 is generally implemented by digital signal processing (DSP), and calculations and outputs are performed at each predetermined control cycle. In order to perform such fixed-cycle operations, a clock signal (CLK) is supplied to the controller 1100. In addition, a power supply (not shown) and the like is also supplied to the controller 1100.

Figure 8A:
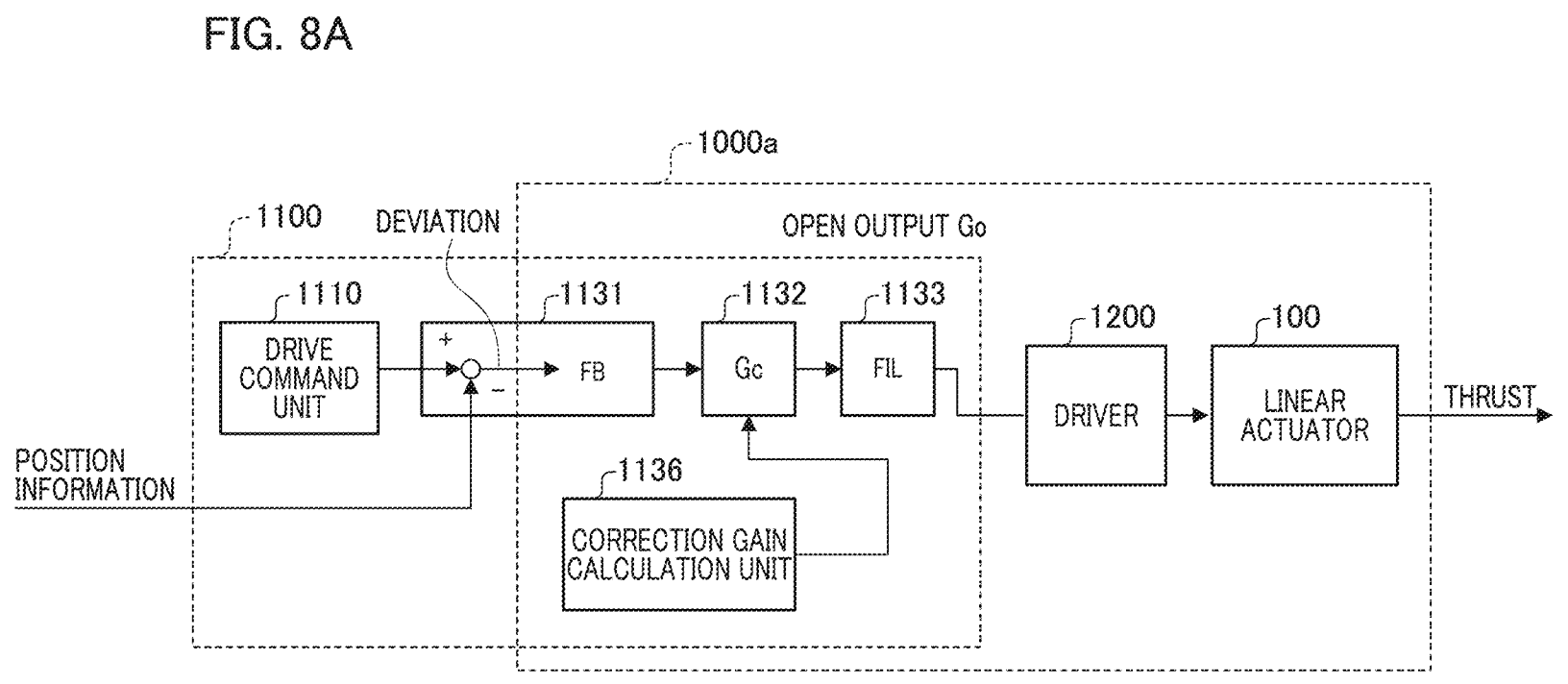
Figure 8B:
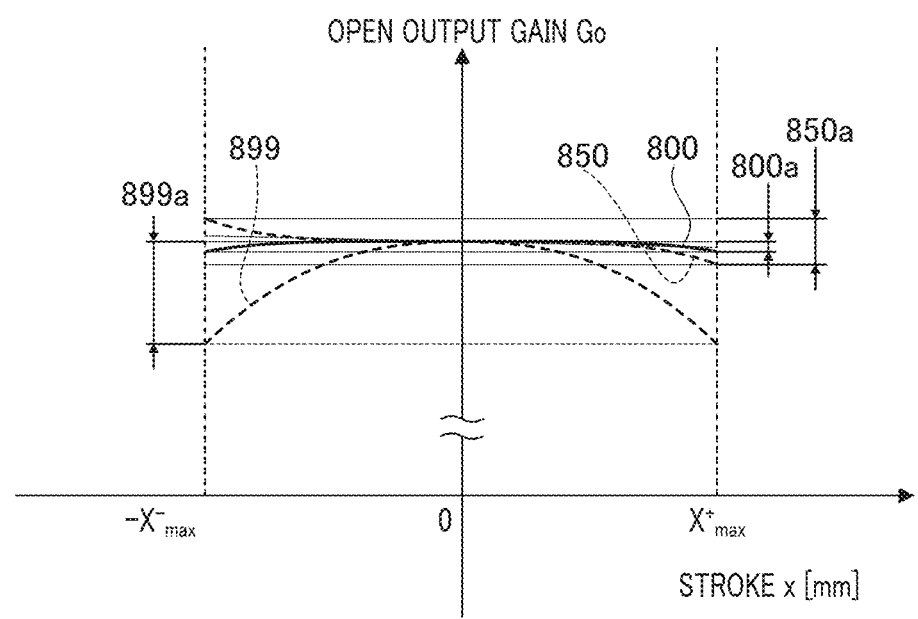

FIGS. 8A and 8B are diagrams explaining the open output characteristics of the linear actuator 100. FIG. 8A is a block diagram showing the open output in the control system 1000. FIG. 8B is a graph showing the open output gain $G_O$ of the linear actuator 100, as an example of the open output characteristics of the linear actuator 100 under predetermined driving conditions.

The open output in the linear actuator 100 and the control system 1000 is explained as the response from the portion extending from the deviation input to the control amount calculation unit 1131, to the thrust output by the linear actuator 100. In FIG. 8A, the portion from the deviation input to the control amount calculation unit 1131 to the generation of thrust by the linear actuator 100 is shown in the control system 1000a. Assuming the open output gain as $G_O$, the characteristics under predetermined drive conditions are shown in FIG. 8B. In FIG. 8A, the control amount calculation unit 1131 is shown in the control system 1000a.

In FIG. 8B, a dashed line 899 represents the open output characteristics in a case in which no correction is performed by the control amount correction unit 1132. A dashed line 850 represents the open output characteristics in a case in which the correction gain used in the control amount correction unit 1132 is calculated by considering only the stroke position, that is, by considering only one parameter. In contrast, a solid line 800 represents the open output characteristics of the present embodiment. That is, the solid line 800 shows the open output characteristics in a case in which the correction gain used in the control unit 1132 is calculated by considering the three parameters of stroke position, output level, and direction of output.

In a case in which no correction is performed by the control amount correction unit 1132, as represented by the dashed line 899, variation occurs in the open output characteristics due to the stroke position, as represented by a variation range 899a. In a case in which no correction is performed by the control amount correction unit 1132, the varied output characteristics of the linear actuator 100, shown in FIGS. 2A and 2B, are also output without any change as the open output characteristics. Therefore, in the dashed line 899, the range of variation of the open output characteristics due to the stroke position is large, as represented by the variation range 899a.

In the case represented by the dashed line 850, in which a correction is performed by considering only the stroke position (that is, only one parameter), variation in the open output characteristics due to the stroke position occurs, as represented by a variation range 850a. In a case in which the correction is performed by considering only the stroke position, although the range of variation becomes smaller compared to the case in which no correction is performed by the control amount correction unit 1132, a certain amount of variation still remains. This is because in a case in which correction is performed by considering only the stroke position, the variation due to the output level and output direction of the linear actuator 100 remains, and under certain conditions, corrections based solely on stroke position can lead to overcorrection.

In the case of performing correction in the present embodiment in consideration of the three parameters of stroke position, output level, and output direction of the linear actuator 100, as indicated by the solid line 800, variation in the open output characteristics due to the stroke position occurs, as represented by a variation range 800a. In the case in which correction is performed by considering the three parameters of stroke position, output level, and output direction, the variation in the open output characteristics is small, and a substantially constant characteristic can be obtained. Thus, in the present embodiment, in positioning control that uses the linear actuator 100, it is possible to reduce the influence caused by the variation of the output characteristics of the linear actuator 100 and perform control of the linear actuator 100.

By correcting the control amount with a correction gain that considers the three parameters of stroke position, output level, and output direction, the output gain at the stroke end parts can be increased, as represented by the solid line 800. Therefore, it is possible to reduce the influence on drivability due to output characteristic differences in the linear actuator 100. By performing control of the linear actuator 100 so as to reduce the influence on drivability due to output characteristic differences, in the camera system 1, it is possible to improve the followability of the focus lens 21 to the focus position, that is, to the subject.

It should be noted that the control system of the linear actuator of the present invention may be freely modified and applied within the essence and principles of the invention. For example, although an example of a unipolar-type linear actuator 100 was explained as the application target of the control configuration in the present embodiment, it is also possible to perform correction of the control amount in other linear actuators of a multipolar-type by digitizing and storing the profile of the output characteristics and calculating the correction gain. In addition, a linear actuator of the present invention is not limited to a linear actuator configured to perform complete linear motion, and may include an actuator that outputs thrust in the tangential direction along a finite arc orbit, as used in an HDD and the like, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-099259, filed Jun. 16, 2023, which is hereby incorporated by reference wherein in its entirety.

What is claimed is:

1. A control system of a linear actuator that is provided with a coil and a magnetic field unit, and is configured to drive a drive target object along a main axis, the control system comprising:

at least one processor and/or circuit configured to function as following units:

a position calculation unit configured to acquire position information of at least one of the drive target object and the linear actuator from an encoder, and to calculate the position information of the drive target object and the linear actuator;

a control amount calculation unit configured to calculate a control amount to control the driving of the linear actuator, based on position information of the drive target object and a target position to move the drive target object;

a determination unit configured to determine an output level of the linear actuator based on the control amount;

a direction determination unit configured to determine an output direction of the linear actuator, based on the control amount and the position information of the linear actuator;

a gain calculation unit configured to calculate a correction gain for correcting the control amount, based on the position information of the linear actuator, the output level of the linear actuator, and the output direction of the linear actuator; and, a correction unit configured to correct the control amount by using the correction gain.

2. The control system according to claim 1, wherein the gain calculation unit selects output characteristic data used in a calculation according to the output level and the output direction from an output characteristic data group of the linear actuator, and calculates the correction gain corresponding to the position information by using the selected output characteristic data.

3. The control system according to claim 2,
wherein the output characteristic data is data that is stored
by performing a functional approximation of a profile
of output characteristics of the linear actuator in
advance.

4. The control system according to claim 2,
wherein the output characteristic data is data that is stored
by discretizing a profile of output characteristics of the
linear actuator in advance.

5. The control system according to claim 1,
wherein the linear actuator is a unipolar-type in which the
polarity of average interlinkage magnetic flux acting on
the coil is constant within a finite stroke range.

6. The control system according to claim 1,
wherein the correction gain, in a case in which the
position of the linear actuator is at the end part of the
stroke, is greater than the correction gain in a case in
which the position of the linear actuator is at the center
of the stroke.

7. The control system according to claim 1,
wherein the correction gain, in a case in which the output
direction of the linear actuator is from the center to an
end part in a diverging direction, is greater than the
correction gain in a case in which the output direction
is from an end part to the center in a converging
direction.

8. The control system according to claim 1,
wherein the drive target object is a lens of a part of a lens
group that configures an image capturing optical sys-
tem; and
the linear actuator drives the drive target object parallel to
the optical axis of the image capturing optical system.

9. A lens apparatus comprising:
an image capturing optical system configured to form an
optical image on an image capturing element;
a linear actuator configured to drive a lens that is part of
a lens group that configures the image capturing optical
system, along a main axis parallel to the optical axis of
the image capturing optical system; and,
a control system configured to control drive of the linear
actuator,
wherein the linear actuator is provided with a coil and a
field magnet unit,
wherein the control system comprising:
at least one processor and/or circuit configured to function
as following units:
a position calculation unit configured to acquire position
information of at least one of the drive target object and
the linear actuator from an encoder, and to calculate the
position information of the drive target object and the
linear actuator;
a control amount calculation unit configured to calculate
a control amount to control the driving of the linear
actuator, based on position information of the drive
target object and a target position to move the drive
target object;
a determination unit configured to determine an output
level of the linear actuator based on the control amount;
a direction determination unit configured to determine an
output direction of the linear actuator, based on the
control amount and the position information of the
linear actuator;
a gain calculation unit configured to calculate a correction
gain for correcting the control amount, based on the
position information of the linear actuator, the output
level of the linear actuator, and the output direction of
the linear actuator; and, a correction unit configured to correct the control amount
by using the correction gain.

10. An image capturing apparatus comprising:
an image capturing element
an image capturing optical system configured to form an
optical image on the image capturing element;
a linear actuator configured to drive a lens that is part of
a lens group that configures the image capturing optical
system, along a main axis parallel to the optical axis of
the image capturing optical system; and,
a control system configured to control drive of the linear
actuator,
wherein the linear actuator is provided with a coil and a
field magnet unit,
wherein the control system comprising:
at least one processor and/or circuit configured to function
as following units:
a position calculation unit configured to acquire position
information of at least one of the drive target object and
the linear actuator from an encoder, and to calculate the
position information of the drive target object and the
linear actuator;
a control amount calculation unit configured to calculate
a control amount to control the driving of the linear
actuator, based on position information of the drive
target object and a target position to move the drive
target object;
a determination unit configured to determine an output
level of the linear actuator based on the control amount;
a direction determination unit configured to determine an
output direction of the linear actuator, based on the
control amount and the position information of the
linear actuator;
a gain calculation unit configured to calculate a correction
gain for correcting the control amount, based on the
position information of the linear actuator, the output
level of the linear actuator, and the output direction of
the linear actuator; and,
a correction unit configured to correct the control amount
by using the correction gain.

11. A control method of a linear actuator that is provided
with a coil and a magnetic field unit, and is configured to
drive a drive target object along a main axis, the method
comprising:
acquiring the position information of the drive target
object or the linear actuator from an encoder, and
calculating the position information of the drive target
object and the linear actuator;
calculating a control amount to control drive of the linear
actuator, based on position information of the drive
target object and a target position to move the drive
target object;
determining an output level of the linear actuator based on
the control amount;
determining an output direction of the linear actuator,
based on the control amount and the position informa-
tion of the linear actuator;
calculating a correction gain for correcting the control
amount, based on the position information of the linear
actuator, the output level of the linear actuator, and the
output direction of the linear actuator; and,
correcting the control amount by using the correction
gain.

12. A non-transitory storage medium storing a control
program for a control system of a linear actuator, causing a
computer to perform each step of a control method of the
control system, the method comprising:

acquiring the position information of the drive target object or the linear actuator from an encoder, and calculating the position information of the drive target object and the linear actuator;

calculating a control amount to control drive of the linear actuator, based on position information of the drive target object and a target position to move the drive target object;

determining an output level of the linear actuator based on the control amount;

determining an output direction of the linear actuator, based on the control amount and the position information of the linear actuator;

calculating a correction gain for correcting the control amount, based on the position information of the linear actuator, the output level of the linear actuator, and the output direction of the linear actuator; and, correcting the control amount by using the correction gain.

* * * * *